United States Patent
Stephany et al.

[11] Patent Number: 5,995,193
[45] Date of Patent: Nov. 30, 1999

[54] SELF-CONTAINED DEVICE FOR RECORDING DATA ENCODED EITHER IN VISIBLE OR INVISIBLE FORM

[75] Inventors: Thomas M. Stephany, Churchville; Bryan D. Bernardi, Rochester, both of N.Y.

[73] Assignee: Eastman Kodak Company, Rochester, N.Y.

[21] Appl. No.: 09/071,483

[22] Filed: May 1, 1998

[51] Int. Cl.⁶ .............................. G03B 29/00; G11B 7/08
[52] U.S. Cl. .............................. 355/31; 355/40; 396/312; 360/2; 40/455; 347/98
[58] Field of Search ................................... 396/310, 311, 396/312, 319; 355/31, 40, 41; 358/502; 360/2, 1; 40/455; 347/3, 19, 98, 108

[56] References Cited

U.S. PATENT DOCUMENTS

| | | | |
|---|---|---|---|
| 3,474,194 | 10/1969 | Lees et al. ................................... | 360/2 |
| 3,970,803 | 7/1976 | Kinzie et al. ................................ | 360/2 |
| 4,570,250 | 2/1986 | Gabritsos et al. .......................... | 360/2 |
| 4,905,029 | 2/1990 | Kelley . | |
| 5,276,472 | 1/1994 | Bell et al. ................................. | 396/312 |
| 5,313,235 | 5/1994 | Inoue et al. . | |
| 5,547,501 | 8/1996 | Maruyama et al. ....................... | 347/19 |
| 5,771,051 | 6/1998 | Guenther et al. .......................... | 347/19 |
| 5,815,174 | 9/1998 | Stone ....................................... | 347/19 |

*Primary Examiner*—Alan A. Mathews
*Attorney, Agent, or Firm*—David M. Woods

[57] ABSTRACT

A self-contained device for recording data encoded either in visible or invisible form or both on a medium, and for playback of data encoded either in visible or invisible form or both on the medium, the device comprises a case for forming a self-contained housing for the device; a recording portion for recording either or both visible and invisible ink on the medium, or recording either or both visible and invisible dye; and a detecting portion for detecting either or both visible and invisible ink, or detecting either or both visible and invisible dye.

6 Claims, 4 Drawing Sheets

SELF-CONTAINED DEVICE FOR RECORDING DATA ENCODED EITHER IN VISIBLE OR INVISIBLE FORM

FIELD OF THE INVENTION

The invention relates generally to the field of image print reproduction having sound data encoded on the print and, more specifically, to a self-contained, image printing device which permits encoding of the sound through a variety of means and the playback thereof.

BACKGROUND OF THE INVENTION

Printing of visually observable data on still reflection prints is known. For example, it is well known to optically expose time and date data on photographic film in a camera which is then reproduced during the photographic printing process in human readable form on the print. Typically, this optically reproduced data appears within the image area on the print. A disadvantage of this arrangement is that it obscures the image area and interferes with pleasurable viewing of the print. Moreover, it is limited to a small amount of data, such as time and date.

It is also known to imprint data, including sound-related data, on a still image reflection print in the form of machine readable code such as a bar code which is observable to the human eye but requires an electronic sensor to read and decode the data. An example of such an arrangement is disclosed in U.S. Pat. No. 5,313,235. A disadvantage of such an arrangement is that the bar code obscures the image if printed upon the front, and also offers a limited amount of data that is not conducive to imprinting sound information that was taken during the picture taking event or for the recording of historical annotations while viewing the print. In the '235 patent, the imprinted data constitutes essentially a memory address pointing to an address location in a remote memory device where the actual sound data is stored. The actual sound data is not physically tied to the print. Since the sound information is stored separately from the print, the sound information can become disassociated from the print and lost.

U.S. Pat. No. 4,905,029 is an example of the use of magnetic recording strips on photographic prints for storage of sound information directly on the print. While offering the advantage of keeping the sound information physically associated with the print, it also has certain disadvantages. It provides a limited storage space and uses up available image space when placed on the front of the print. Moving the magnetic strip to the back of the print reduces accessibility and makes it awkward to reproduce the sound while viewing the print. It requires a magnetic reader head employing relative motion between the head and magnetic strip for signal reproduction. Critical alignment between the read head and data track, as well as maintaining intimate contact between the head and magnetic strip are important considerations that make magnetic signal reproduction an unattractive option for sound reproduction from still image prints. Additionally, magnetic recording media has a limited lifespan that includes inherent loss of the magnetically recorded data over time.

Commonly owned U.S. patent application Ser. No. 08/931,575 to Socia et. al. discloses a method of storing data on a still image reflection print including optically imprinting the data on the surface of the image print as a two-dimensional data array which is invisible to the human eye under normal viewing conditions. It also describes a hand-held data reader device and a manually rolled data reader, both with capabilities of reading the invisible encoded data. These devices include an optical sensor responsive to the invisible information, a data decoding unit for decoding the received signal into an analog sound signal corresponding to the sound represented by the invisible information, and a sound transducer for playing the analog sound while the print is being viewed.

Socia et. al., while addressing limitations of U.S. Pat. No. 5,313,235 and U.S. Pat. No. 4,905,029, fail to account for situations wherein both visible and invisible information would want to be recorded on a print, label or recordable media. This information could include an index number, address or some other visible annotation which the viewer needs to see. In the case of a multimedia presentation, it could be something as simple as a visible message in the form of printed text telling the viewer to scan the print, label or media for additional information which has been recorded in the form of sound. It also fails to address situations wherein the same types of information, both visible and invisible, would reside specifically upon the front or back of a print, label or recordable media. It also does not address situations wherein both visible and invisible information would want to be imprinted and used within a given application. As an example, a baseball card could include the players statistics visibly stored for visual reading, and also include the statistics invisibly stored for voice playback. Since both these modes represent useable data, it would be beneficial to be able to electronically read both forms. And, since it would also be beneficial for a user to be able to place such variations of information upon a surface, there exists a need for a device with the capabilities herein described.

In addition, Socia et. al. fail to address limitations in the use of hand-held devices for the reading and playback of encoded information. The disclosed devices, which are both extremely sensitive to the motions of the individual user, require codes which incorporate large amounts of correction, thus limiting the amount of sound which can be recorded in a given area.

Consequently, there is a need for a device which provides capabilities for both the encoding and playback of sound recorded in either or both visible and invisible form for overcoming the above-described drawbacks.

SUMMARY OF THE INVENTION

The present invention is directed to overcoming one or more of the problems set forth above. Briefly summarized, according to one aspect of the present invention, the invention resides in a self-contained device for recording data encoded either in visible or invisible form or both on a medium, and for playback of data encoded either in visible or invisible form or both on the medium, the device comprising: (a) a case for forming a self-contained housing for the device; (b) means for recording both visible and invisible ink on the medium or recording both visible and invisible dye; and (c) means for detecting both visible and invisible ink or detecting both visible and invisible dye.

The above and other objects of the present invention will become more apparent when taken in conjunction with the following description and drawings wherein identical reference numerals have been used, where possible, to designate identical elements that are common to the figures.

PREFERRED EMBODIMENT

A detailed description of the present invention will now be described in detail with reference to the drawings.

Figure 1:
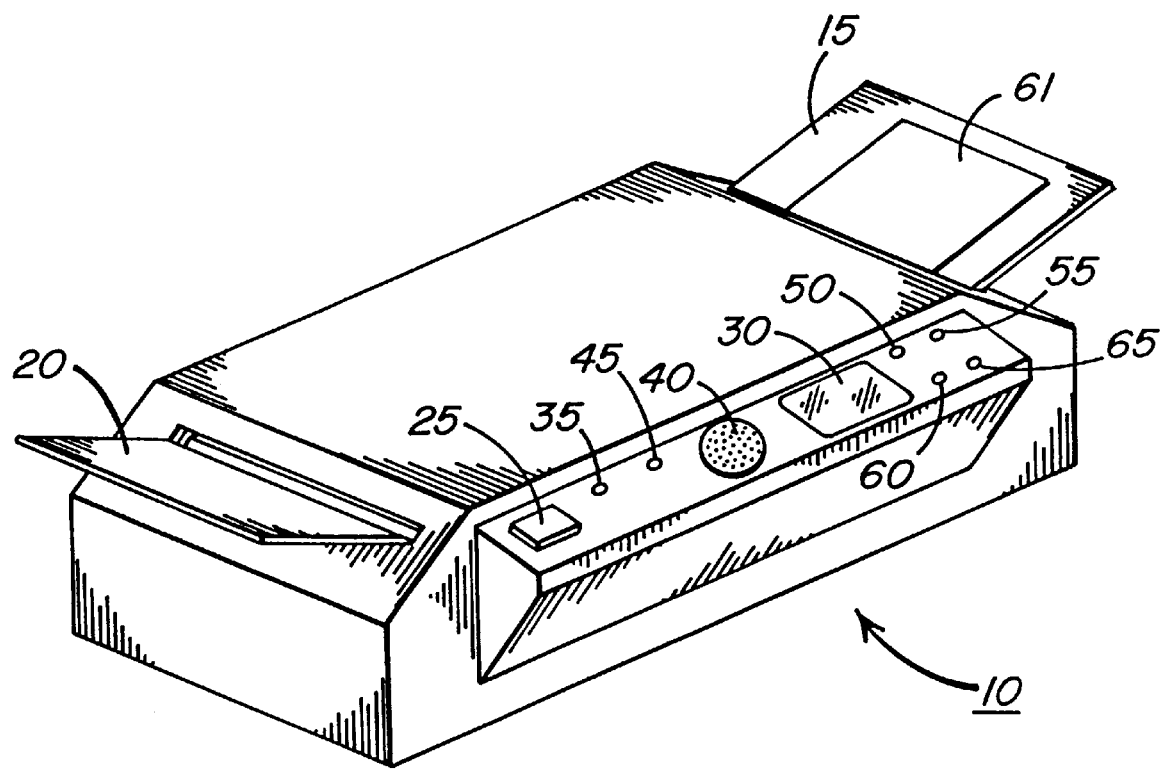
FIG. 1 is a perspective view of the device of the present invention illustrating the general configuration of the device.

Referring to FIG. 1, the outer configuration of the present invention will be described as embodying a playback device. Before discussing the details of the invention, it is instructive to note that the present invention will search for sound data which is encoded upon a medium, but more importantly, detects whether or not the data has been encoded with visible or invisible ink thereby permitting playback of either or both. The present invention will also record data with either visible or invisible ink or both, or either visible or invisible dye. The main housing 10 of the playback device has integrated into it an input tray 15 for receiving media 61 to be processed, and an output tray 20 for delivering the processed media 61 to the user. On the front surface of the playback device, there are disposed a power button 25, a liquid crystal display (LCD) 30, a microphone jack 35 for the inputting of sound, and a speaker 40 for the outputting of sound. A keyboard jack 45, video input/output jacks 50 and 55 and audio input/output jacks 60 and 65 are also disposed on the housing. A microprocessor (not shown) is positioned in an interior portion of the housing 10 for controlling operations of the device.

Upon energizing the equipment via an electrical cord (not shown) connected to the equipment with the power button 25, the user will answer a series of questions generated on the LCD display 30 by the microprocessor, as described hereinbelow. These prompts will, in a logical sequence, ask the user for information which is necessary to playback or encode a processed print or other similar sheet type media. For purposes of illustrating a preferred embodiment, the plurality of media which could be encoded or played back will be hereafter referred to as a print 61.

Figure 2:
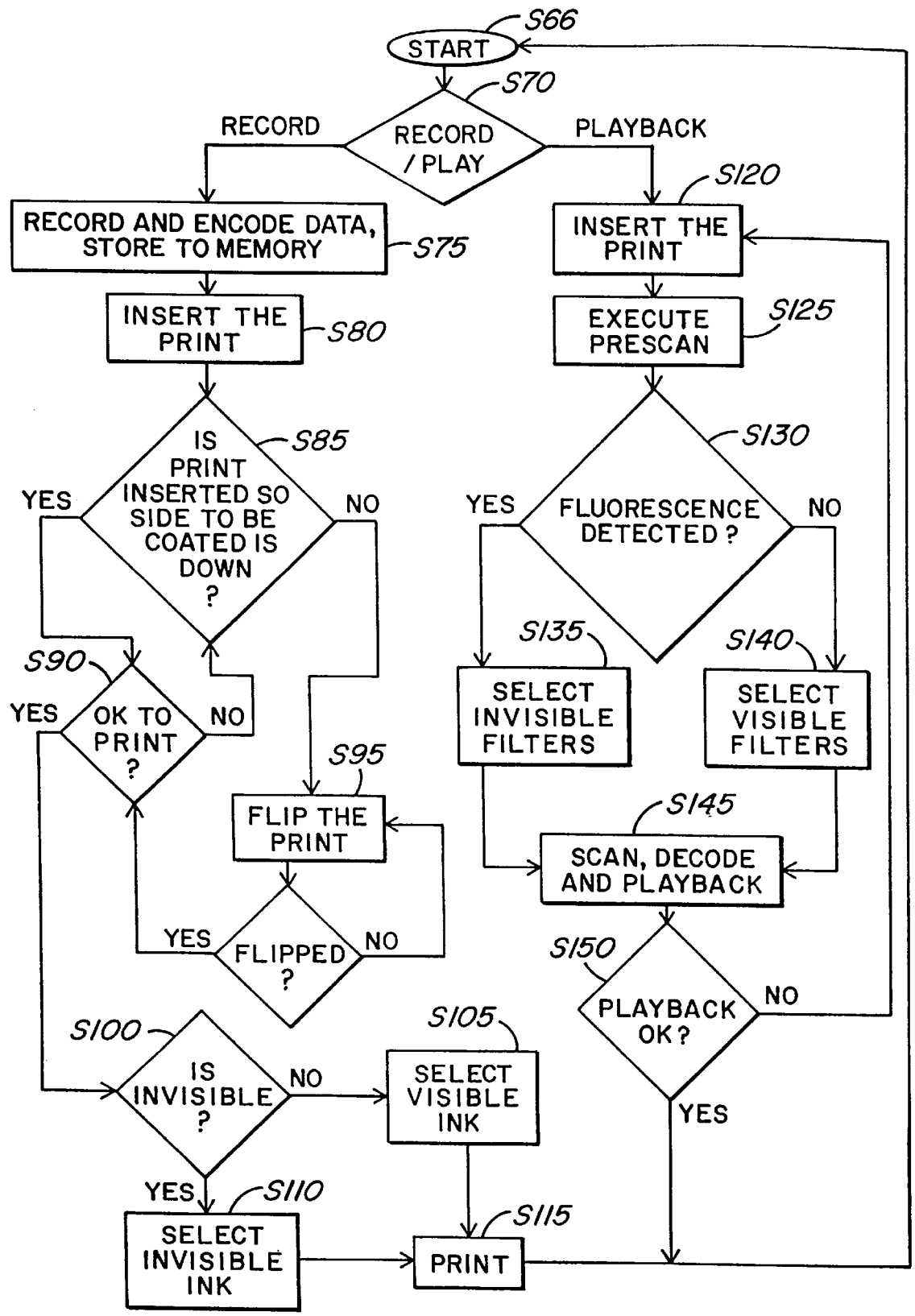
FIG. 2 is a flowchart which details the command structure of both the printing and playback modes.

Referring to FIG. 2, the flow chart details a typical encoding sequence, for example by using a microphone as one means of inputting to the equipment. The equipment is started S66 and the user then determines S70 whether a print is to be recorded or played back. Upon the determination that this is a recording session, the user is prompted to perform the recording, and the vocal information is encoded and retained within memory S75. When the recording is finished, the user is prompted S80 via the LCD display 30 to insert the print 61 into the input tray 15. After the print 61 is inserted, the user is prompted S85 for confirming that the print 61 is inserted with the desired side for recording facing downwardly. It should be noted that depending upon user preference, either side of the print may be the recordable side. If the answer is yes, the LCD display 30 prompts the user "O.K. to Print?" S90. If the question at S85 is no, the user is prompted to flip the medium S95. After flipping the print 61, the user is asked whether it is "O.K. to Print" S90. When a yes answer is received for printing, the user is prompted S100 as to the type of ink to be used, visible or invisible. If the answer to step S100 is yes, the unit will print with the invisible ink cartridge S110, if no, the unit will print with the visible ink cartridge S105. The equipment then prints according to the selected ink S115.

Now referring back to S70, if the user selects the playback function, a prompt occurs which directs the user to insert S120 the print 61 for scan, decode and playback S145. However, before performing the playback S145, a prescan is performed S125 which detects for fluorescence S130 before actual scanning. If found, filters S135 are selected to excite the invisible ink at their specific infrared frequency for scanning, decoding, and playback S145, and if not, another set of filters S140 are selected for scanning, decoding and playback S145 of the visible ink. Step S150 queries if playback is acceptable. If not, return to S120. If playback occurs, the equipment is returned to the start mode S66.

Figure 3:
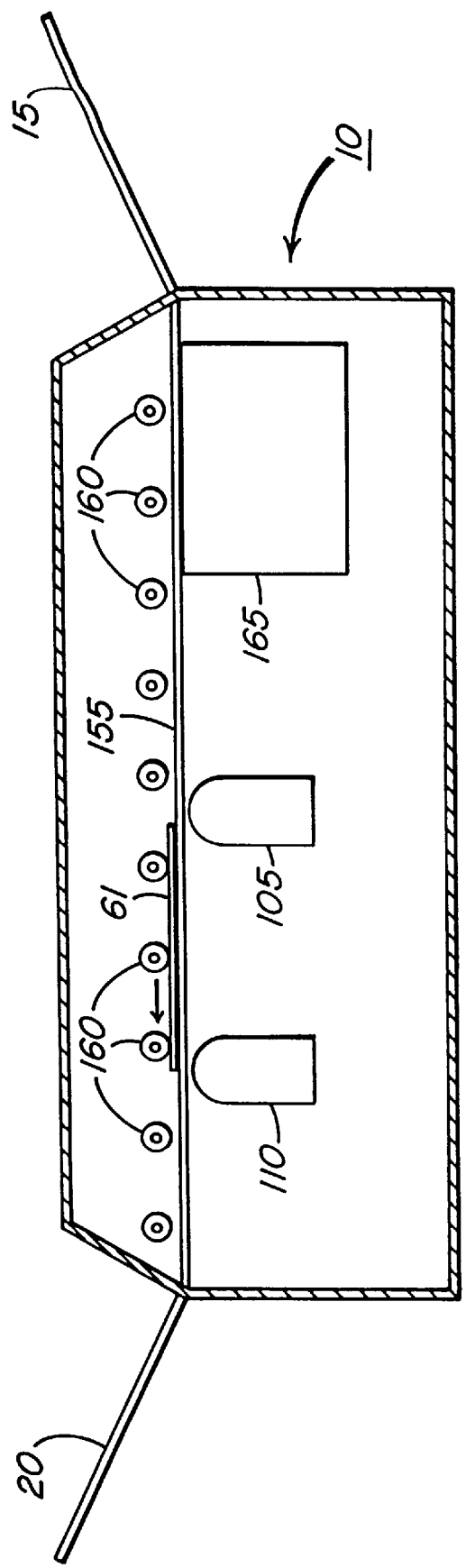
FIG. 3 is a view in cross-section of the device of the present invention which illustrates the media path and the printing and scanning sections.

FIG. 3 details a cross section of the interior of the present invention, showing the processing path 155 through the device 10. Drive wheels 160 move the print 61 past the scanner section 165 for scanning, decoding and playback. For encoding, the drive wheels 160 move the print 61 past the scanning section 165, where it is to be encoded either by invisible ink cartridge 110 or visible ink cartridge 105 or both. Print 61 flows from input tray 15 to output tray 20. The aforementioned invisible ink or dye is one which has sufficient spectral absorption in the infrared region and virtually none in the visible spectrum, such as that disclosed in U.S. patent application Ser. No. 08/931,575.

Figure 4:
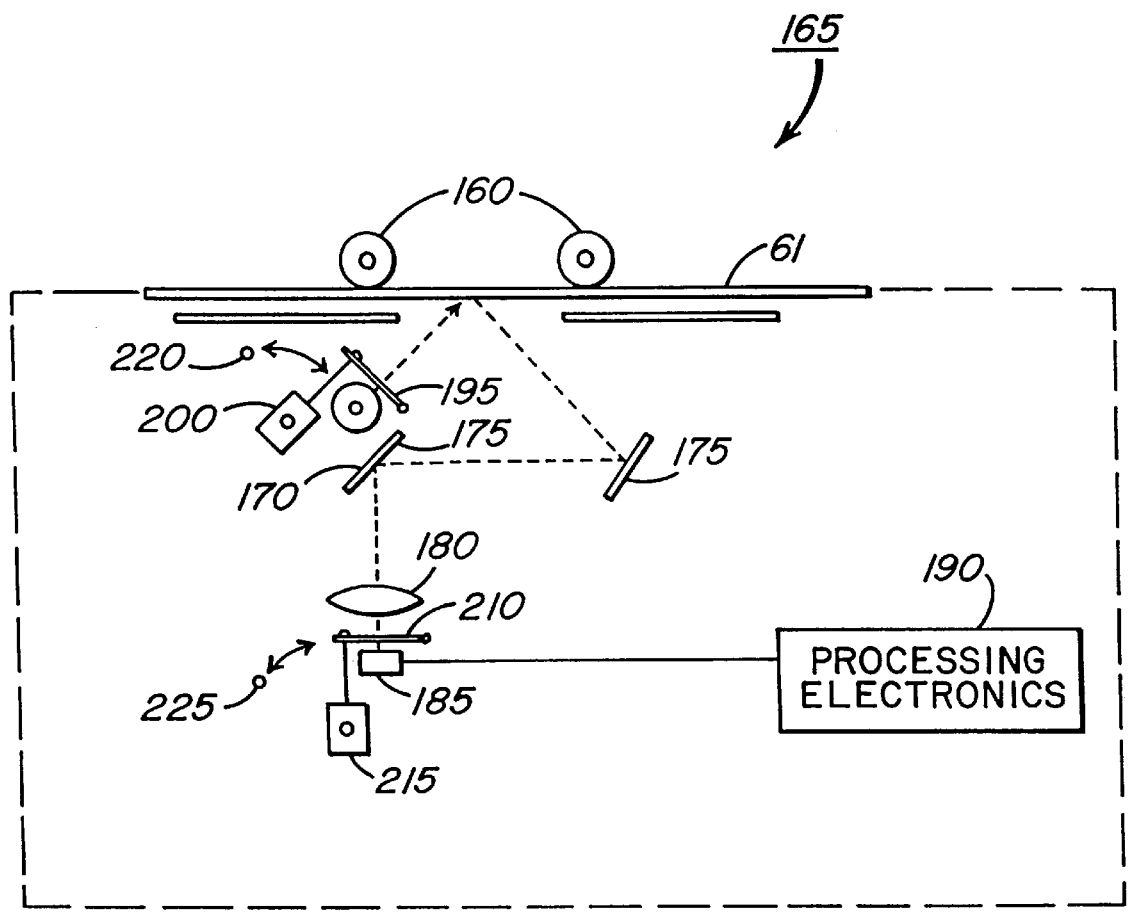
FIG. 4 is a drawing illustrating the internal structure of the scanning section of the present invention having, among other details, retractable filters which permit scanning both visible and invisible images.

FIG. 4 details a cross-section of the optical section 165. The print 61 is fed through the scanner by drive wheels 160. The print 61 is illuminated by a light source 170, typically a fluorescent tube, and the reflection of the light off the print 61 is reflected to two mirrors 175, where the reflection is transmitted by the mirrors 175, through the lens 180 and to charge-coupled device (CCD) 185. The dashed arrows illustrate the light path through the scanner. This information is processed by the processing electronics 190 to form an image of the original print 61. A feature of the present invention is that the optical scanner section 165 includes filters which makes it capable of scanning both visible and invisible images, which prior art scanners currently cannot do. Filter 195, being a band-pass filter which is attached to pivotal actuator 200, passes only the light necessary to cause fluorescence of the invisible ink or dye in print 61. Filter 210, being a high pass filter attached to pivotal actuator 215, passes only the wavelength emitted by the invisible ink or dye in print 61. If no fluorescence is detected by the CCD 185, the filters 195 and 210 are retracted to stops 220 and 225 and the document is scanned without the filters 210 and 195 by any well-known scanning technique.

What is claimed is:

1. A self-contained device for recording data encoded either in visible or invisible form or both on a medium, and for playback of data encoded either in visible or invisible form or both on the medium, the device comprising:

(a) a case for forming a self-contained housing for the device;

(b) a recording portion for recording information in the form of both a visible and an invisible printable substance on the medium; and (c) a detecting portion for detecting at least one of the visible and invisible printable substances on the medium.

2. The device as in claim 1 further comprising a sensor; wherein the detecting portion includes a light for illuminating the medium, and includes a first filter for passing predetermined wavelengths of the light to the sensor.

3. The device as in claim 2 further comprising a second filter for passing predetermined wavelengths of the light to the medium for exciting the printable substance thereon.

4. The device as in claim 3, wherein the printable substance is either fluorescent ink or fluorescent dye.

5. The device as in claim 4 further comprising a light source for illuminating the ink or dye thereon.

6. The device as in claim 1, wherein the printable substances include both a visible and an invisible ink or dye.

* * * * *